Figure 1:
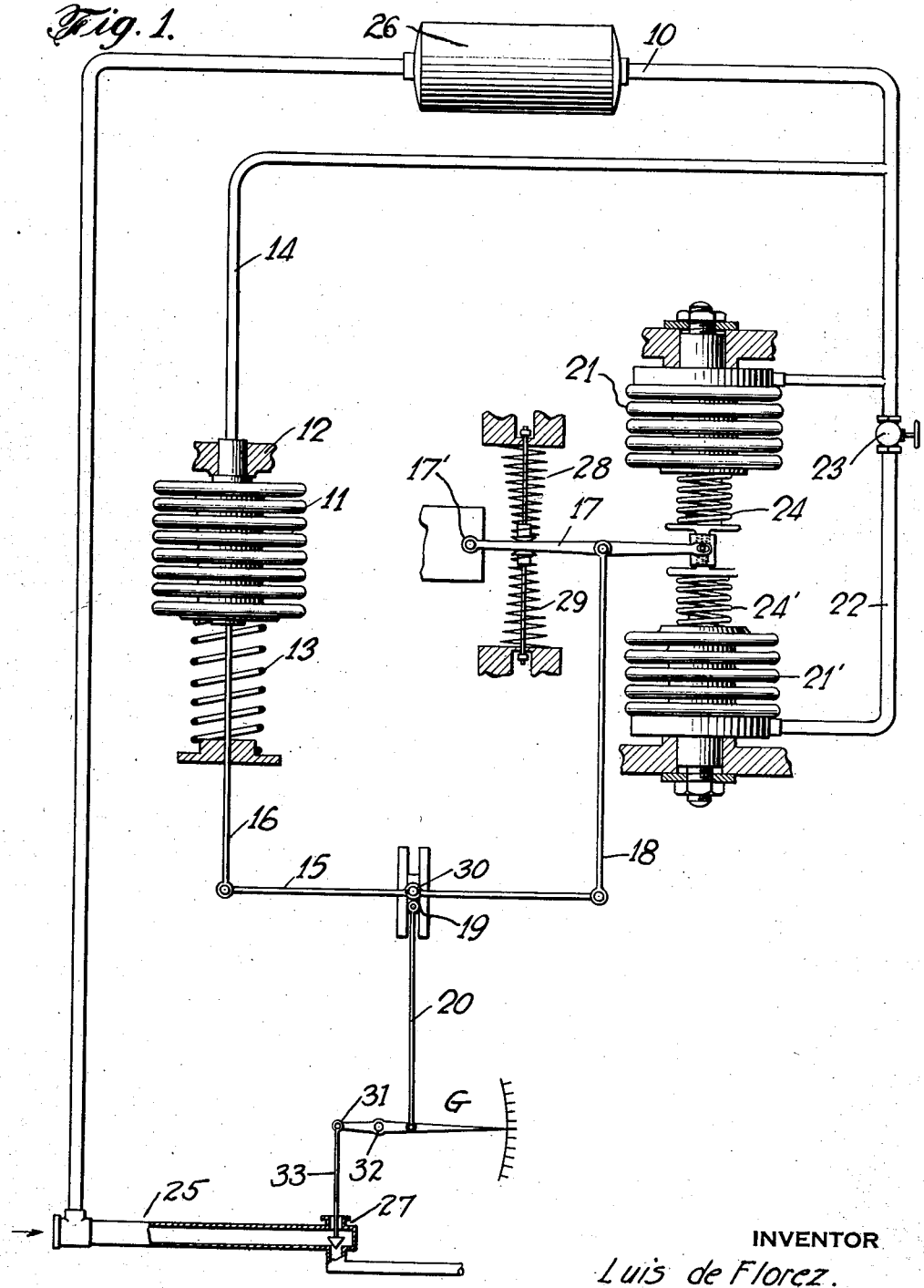

June 25, 1935. L. DE FLOREZ 2,005,773
APPARATUS FOR INDICATING OR CONTROLLING PHYSICAL CHANGES
Original Filed Oct. 19, 1927

INVENTOR
Luis de Florez.
BY his ATTORNEYS
Hoguet & Neary

Patented June 25, 1935

2,005,773

UNITED STATES PATENT OFFICE 2,005,773

APPARATUS FOR INDICATING OR CONTROLLING PHYSICAL CHANGES

Luis de Florez, Pomfret, Conn.

Original application October 19, 1927, Serial No. 227,345. Divided and this application February 7, 1931, Serial No. 514,165. Renewed February 5, 1934

12 Claims. (Cl. 236—1)

This invention relates to devices for indicating, recording and controlling physical changes with respect to the rate as well as the degree of such change. In its broader and more general aspects, the invention is concerned with apparatus responsive to pressure and/or temperature changes in industrial processes. More particularly, the invention provides a novel combination of mechanical devices which, during a period of changing process temperature or pressure, will measure and/or control the rate of such change and during a period of constant process pressure or temperature will indicate the magnitude thereof.

Many industrial processes are dependent for their successful operation upon the maintenance of definite pressure or temperature conditions and are adversely affected by changes of undue magnitude or duration. The present invention finds particular utility in the operation control of such processes since the apparatus is responsive to the rate as well as the degree of such physical changes and therefore regulatory steps may be intelligently and systematically initiated before the temperature or pressure change has reached its full extent. The invention is further of particular industrial value in that the apparatus thereof may be used in conjunction with any d ed auxiliary measuring or control instruments.

The present practice with regard to indicating, recording or controlling process temperatures and pressures involves the use of instruments or devices which continually reflect true or approximately true instantaneous values regardless of whether the temperature or pressure is constant or changing. Thus at a time of process temperature or pressure change such devices will reflect a constantly changing value which measures the instantaneous magnitude of the changing factor but gives no indication of the rate at which such change is occurring. In the present invention means are provided not only for indicating instantaneous values but also for indicating values which measure the rate of change as well. This object of the invention is attained by magnifying the resultant response of the apparatus during periods of change and the device so functions that the magnification of the temperature or pressure values at a time of temperature or pressure change is proportional to the rate of such change. Thus a rapid change in process pressure or temperature will occasion a greater degree of magnification in the response of the apparatus thereto than a more gradual change.

In the attached drawing the figure is a diagrammatic assembly drawing of one form of the apparatus showing in some detail the several units thereof, together with an illustrative adaptation of the apparatus to industrial pressure control.

Referring to the figure, 10 is a by-pass conduit communicating with a fluid conduit 25 leading from an external source of fluid supply (not shown) as, for example, the vaporizer of a cracking unit. A chamber 26 filled with a non-compressible fluid may conveniently be placed in the line 10 for the purpose of supplying such a fluid to the operative portions of the apparatus in order that greater uniformity of operation may be attained. This structure is particularly desirable when a gaseous fluid is the source of pressure. A bellows device 11 is mounted between a stationary support 12 and a spring 13. The pipe 14 establishes communication between the conduit 10 and the bellows 11 and the pressure of the external system is transmitted therethrough to the said bellows which in turn acts upon the arm 15 through the medium of the link 16. At its opposite end the arm 15 is attached to a link 18 connecting said arm with the lever 17 pivoted at 17'.

The bellows devices 21 and 21' also communicate with the by-pass conduit 10 and transmit pressure therefrom to the free end of the lever 17 and thence through the link 18 to the arm 15. The bellows 21 and 21' are in opposed relation and communication between the fluid spaces thereof is provided by the pipe 22 carrying the valve 23 by means of which the transmission of the full line pressure in the conduit 10 to the bellows 21' may be delayed for a regulable period of time. The springs 24 and 24' are interposed between the free end of the lever 17 and the bellows 21 and 21' respectively in order to provide means for occasioning a movement of the lever 17 equivalent to the pressure applied in the bellows 21 and 21' when a non-compressible fluid is used in the system. When a compressible fluid is used in the system the bellows 21 and 21' will of course perform the function of the springs 24 and 24' and hence the said springs may, if desired, be dispensed with under such circumstances. Since the proper functioning of the apparatus necessitates a pressure differential across the valve 23 at a time of change in the main line pressure, the springs 28 and 29 acting upon the lever 17 are provided to counterbalance a portion of the direct pressure of the bellows 21 or 21' (depending upon the direction of the pressure change).

The arm 15 is provided, intermediate its ends, with a cross-head 19 to which is attached a rod 20 actuating a gauge arm G. The gauge arm G is pivoted at the point 32 and one end thereof acts as a pointer for indicating purposes while the opposite end is connected to a link 33 operating a control valve 27. It is to be understood of course that the indicating and control mechanism aforementioned is presented merely as an illustrative adaptation of the apparatus for control purposes and in no way limits the scope of the invention with respect to its industrial application. It will also be noted that a continuous indication of instantaneous main line pressure values (as compared with the indication of the rate of pressure change by means of the gauge G) may be obtained if desired by attaching to the rod 16 at its lower end a gauge arm and pointer (not shown) acting upon a suitably calibrated scale.

When adapted to the indication and control of pressure in a vessel or conduit adjacent thereto, the operation of the apparatus is as follows: Assume that the same pressure exists in the bellows 11, 21 and 21' (as during a period of constant process pressure), the valve 23 being partially closed. The control system is then in a state of equilibrium, the arm 17 is horizontal, and the control valve 27 maintains a constant efflux through the fluid conduit 25. If a sudden increase in process pressure occurs the bellows 11 and 21 are affected immediately and occasion a downward movement of the two ends of the arm 15. The end acted upon by the bellows 11 will be depressed an amount proportional to the degree of process pressure increase while the depression of the end acted upon by the bellows 21 will depend upon the design for the apparatus and may or may not be equal in magnitude to the depression of the opposite end. Assume that the various elements of the apparatus have been so proportioned as to occasion the same initial depression of both ends of the arm 15 at a time of process pressure change. The said arm will then maintain a horizontal position during its downward movement. The initial response of the gauge G and the control valve 27 will then be magnified one hundred percent. In other words, the control valve will open, say, twice as much as is proportionately necessary to counterbalance the actual instantaneous process pressure increase and thus anticipates and forestalls a further increase in said pressure.

The bellows device 21' is also affected by the aforesaid increase in process pressure but, due to the interposition of the valve 23 in the line 22, the full response thereof is delayed and the time interval involved in any particular case will depend upon the setting of the valve 23, tension in the springs 28 and 29, and the relative positioning of the several contact points on the lever arm 17. During the said lag period the pressure in the bellows device 21' will gradually build up to a value equal to the pressure in the bellows 21. This gradual response will occasion a gradual raising of the lever arm 17 to its original horizontal position which in turn affects a gradual lifting of arm 15 at the end attached to the link 18. The magnified response of the control valve 27 to the initial pressure change is thereby compensated at a predetermined rate which is based upon rate of process pressure change and the needs or characteristics of the industrial process being controlled. Thus if the process pressure continued to increase the full compensation of the initial magnified response of the control apparatus would be deferred much longer than under conditions involving a relatively rapid return of the process pressure to the proper level.

When the invention is adapted to control as well as indication of pressure changes (as in the illustrative assembly) the pressure in each of the several bellows devices will eventually return to the original value corresponding to the predetermined proper process pressure, and both the arm 15 and the arm 17 will revert to horizontal positions at their respective original levels, after the said process pressure has re-attained its datum level. If, however, the invention is applied merely to the indication of pressure and pressure changes, then bellows 11, which at all times reflects the actual process pressure value, will not necessarily bring the arm 15 back to a horizontal position. The lever arm 17 will always be horizontal when the pressures in the bellows 21 and 21' are equal and thus the end of the arm 15 moved by the link 18 will always revert to its original starting point after a sufficient period of constant process pressure. The position of the end of the arm 15 moved by the link 16 will on the other hand depend upon the actual instantaneous value of the process pressure since no compensation is provided for the response of the bellows 11 thereto.

In the preceding description of the operation of this invention, example has been made of an application thereof to process pressure indication and control and the response of the apparatus to a positive pressure change has been discussed. The relative simplicity of the operation necessitates no further discussion thereof in connection with pressure decreases since the difference is one of direction only. The adaptation of the invention to the indicating and controlling of process temperature and temperature changes calls for little elaboration of the pressure control operation. In either case the apparatus proper functions in the same manner. When, however, the physical change involved is one of temperature the conduit 10 is connected to a bulb or other suitable vessel containing a fluid capable of creating a pressure proportional to the temperature to which it is subjected. The bulb containing such a fluid is then located at a desired point in the process equipment where it will be responsive to the temperature which it is desired to control and process temperature fluctuations, translated as pressure changes within the control system, will occasion the functioning of the apparatus as previously discussed.

In the description of the invention as shown in the attached drawing, the mechanical devices provided for occasioning a response in the apparatus to physical changes in an external system communicating therewith have been depicted as collapsible bellows (indicated by the reference numerals 11, 21 and 21' in the drawing). In the industrial application of the invention it is contemplated that the aforesaid bellows devices may be supplanted by other devices mechanically equivalent to said bellows. For example, such a modification of the invention might comprise the substitution of a flexible diaphragm, acting directly or indirectly, or through an arrangement of springs, upon the several levers actuating the indicating and controlling mechanism. This and other modifications of the invention logically concerned with the practical use thereof are to be considered well within the scope of said invention.

It is to be understood that in the appended claims when I refer to an apparatus for controlling changes of either temperature or pressure, I mean to include within such term devices for indicating such physical changes of temperature or pressure. Such indicating devices are frequently used as essential elements in the control of such physical changes in a system.

This application is a division of my copending application, Serial No. 227,345, filed October 19, 1927, and issued Dec. 22, 1931, as Patent No. 1,837,853.

I claim:

1. An apparatus for controlling changes of temperature or pressure in a controlled system by means of responsive pressure changes in an adjacent system, which comprises in combination a first mechanical device, a connection between said first mechanical device and said adjacent system whereby said first mechanical device responds fully and immediately to a change of pressure within said adjacent system, a second mechanical device, a connection between said second mechanical device and said adjacent system whereby the initial response of said second device to the said change is full and immediate, a mechanical device, a third connection between said third mechanical device and said adjacent system, said third mechanical device being so related to said second device that the full response of one neutralizes the full response of the other, means for delaying the full response of the said third device to said change in said adjacent system, and control devices operated jointly by said mechanical devices.

2. Control apparatus actuated by pressure changes in an adjacent system, which comprises in combination a first mechanical device, a connection between said first mechanical device and said adjacent system whereby said first mechanical device responds fully and immediately to a pressure change within said adjacent system, a second mechanical device, a connection between said second mechanical device and said adjacent system whereby the initial response of said second device to the said pressure change is full and immediate, a third mechanical device, a connection between said third mechanical device and said adjacent system, said third mechanical device being so related to said second device that the full response of one neutralizes the full response of the other, means for delaying the full response of the said third device to said pressure change in said adjacent system, and control devices operated jointly by said mechanical devices.

3. An apparatus for controlling temperature changes in a controlled system by means of responsive pressure changes in an adjacent system, which comprises in combination a first mechanical device, a connection between said first mechanical device and said adjacent system whereby said first mechanical device responds fully and immediately to a pressure change within said adjacent system, a second mechanical device, a connection between said second mechanical device and said adjacent system whereby the initial response of said second device to the said pressure change is full and immediate, a third mechanical device, a connection between said third mechanical device and said adjacent system, said third mechanical device being so related to said second device that the full response of one neutralizes the full response of the other, means for delaying the full response of the said third device to said pressure change in said adjacent system, and control devices operated jointly by said mechanical devices.

4. An apparatus for controlling changes of temperature or pressure in a controlled system by means of responsive pressure changes in an adjacent system, which comprises in combination a first bellows device, means adapted to permit communication between said first bellows device and said adjacent system, whereby said first bellows device responds fully and immediately to a change of pressure within said adjacent system, a second bellows device, means adapted to permit communication between said second bellows device and said adjacent system, whereby said second bellows device responds immediately to the said change within said adjacent system, a third bellows device, means adapted to permit communication between said third bellows device and said adjacent system, means for permitting a full response of said second bellows device to neutralize the full response of said third bellows device, means for delaying the full response of said third device to the said change within said adjacent system, and control devices operated jointly by said bellows devices.

5. Control apparatus actuated by pressure changes in an adjacent system, which comprises in combination a first bellows device, means adapted to permit communication between said first bellows device and said adjacent system, whereby said first bellows device responds fully and immediately to a pressure change within said adjacent system, a second bellows device, means adapted to permit communication between said second bellows device and said adjacent system, whereby said second bellows device responds immediately to said pressure change within said adjacent system, a third bellows device, means adapted to permit communication between said third bellows device and said adjacent system, means for permitting a full response of said second bellows device to neutralize the full response of said third bellows device, means for delaying the full response of said third device to said pressure change in said adjacent system, and control devices operated jointly by said bellows device.

6. An apparatus for controlling temperature changes in a controlled system by means of responsive pressure changes in an adjacent system, which comprises in combination a first bellows device, means adapted to permit communication between said first bellows device and said adjacent system, whereby said first bellows device responds fully and immediately to a pressure change within said adjacent system, a second bellows device, means adapted to permit communication between said second bellows device and said adjacent system, whereby said second bellows device responds immediately to said pressure change within said adjacent system, a third bellows device, means adapted to permit communication between said third bellows device and said adjacent system, means for permitting a full response of said second bellows device to neutralize the full response of said third bellows device, means for delaying the full response of said third device to said pressure change in said adjacent system, and control devices operated jointly by said bellows device.

7. In a control apparatus, two pressure actuated mechanical devices connected for movement in opposition to one another, a conduit containing fluid of varying pressure, separate connections between said conduit and said mechanical devices, a resistance interposed in one of said connections for delaying the full movement re- -sponse of the related device to a change of pressure in said conduit, whereby the joint movement of said mechanical devices is a function of the rate of pressure change in said conduit, and means for transmitting said joint movement to operation control devices.

8. In an apparatus for controlling changes of temperature or pressure in a controlled system by means responsive to pressure changes in a pressure system, two directly connected similarly constructed mechanical devices communicating with said pressure system and actuated by pressure changes therein, means for occasioning movement of one of said devices in full and immediate response to said pressure changes, means for delaying the full movement response of the other of said devices to said pressure changes, the said movement of each of said mechanical devices being directly dependent on the movement of the other and occasioning a movement differential therebetween, the magnitude of said movement differential being a function of the rate of said pressure changes, and means for transmitting the effect of said movement differential to operation-control devices.

9. In an apparatus for controlling changes of temperature or pressure in a controlled system, a fluid-containing conduit, means for causing the pressure of the fluid in said conduit to vary in response to changes of temperature or pressure in said controlled system, a first bellows device communicating directly with said conduit and actuated by the pressure therein, whereby said first bellows device responds fully and immediately to a pressure change in said conduit, a second similarly constructed bellows device directly connected with said first bellows device and communicating through a resistance with said conduit and actuated by the pressure therein, whereby the full movement response of said second bellows device to said pressure change in said conduit is delayed, the said movement of each of said bellows devices being directly dependent on the movement of the other and occasioning a movement differential therebetween, the magnitude of said movement differential being a function of the rate of said pressure change, and means for transmitting the effect of said movement differential to operation-control devices.

10. In an apparatus for controlling changes of temperature or pressure in a controlled system by means responsive to pressure changes in a pressure system, a mechanical device communicating with said pressure system, which device first responds fully and immediately to a pressure change in said system and then retracts said response in accordance with the rate of said pressure change, and means communicating with said mechanical device for operating control devices in said controlled system in accordance with changes effected in said pressure system and transmitted to said control devices through the intermediary of said mechanical device.

11. In an apparatus for controlling changes of temperature or pressure in a controlled system, two mechanical devices communicating with said controlled system and actuated by changes of temperature or pressure therein, means for occasioning movement of one of said devices in full and immediate response to said changes, means for delaying the full movement response of the other of said devices to said changes, the said movement of each of said mechanical devices being independent of the movement of the other and occasioning a movement differential therebetween, the magnitude of said movement differential being a function of the rate of said changes of temperature or pressure, and means for transmitting the effect of said movement differential to operation-control devices.

12. In an apparatus for controlling changes of temperature or pressure in a controlled system, a fluid-containing conduit, means for causing the pressure of the fluid in said conduit to vary in response to changes of temperature or pressure in said controlled system, a first mechanical device communicating with said conduit and actuated by the pressure therein, means for occasioning movement of said first device in full and immediate response to a pressure change in said conduit, a second mechanical device communicating with said conduit and actuated by the pressure therein, means for delaying the full movement response of said second device to said pressure change in said conduit, the said movement of each of said devices being independent of the movement of the other and occasioning a movement differential therebetween, the magnitude of said movement differential being a function of the rate of said pressure change, and means for transmitting the effect of said movement differential to operation-control devices.

LUIS DE FLOREZ.